(12) United States Patent
Pearce et al.

(10) Patent No.: US 9,141,226 B2
(45) Date of Patent: Sep. 22, 2015

(54) REGISTRATION FOR INTERACTIVE WHITEBOARD

(75) Inventors: Nigel Pearce, Blackburn (GB); Paul Painter, Blackburn (GB); Lee Nelson, Blackburn (GB)

(73) Assignee: Promethean Limited (GB)

( * ) Notice: Subject to any disclaimer, the term of this patent is extended or adjusted under 35 U.S.C. 154(b) by 1299 days.

(21) Appl. No.: 12/603,070

(22) Filed: Oct. 21, 2009

(65) Prior Publication Data
US 2010/0132034 A1    May 27, 2010

(30) Foreign Application Priority Data
Oct. 21, 2008 (GB) .................................. 0819310.4

(51) Int. Cl.
| G06F 3/038 | (2013.01) |
| G06F 3/041 | (2006.01) |
| G06F 3/0488 | (2013.01) |

(52) U.S. Cl.
CPC .............. *G06F 3/0416* (2013.01); *G06F 3/038* (2013.01); *G06F 3/041* (2013.01); *G06F 3/0418* (2013.01); *G06F 3/0488* (2013.01)

(58) Field of Classification Search
CPC ... G06F 3/0304; G06F 3/017; G06F 3/03545; G06F 3/0425; G06F 3/041
See application file for complete search history.

(56) References Cited

U.S. PATENT DOCUMENTS

| 6,199,877 | B1 * | 3/2001 | Shockley ...................... 280/32.6 |
| 2001/0030668 | A1 * | 10/2001 | Erten et al. .................... 345/863 |
| 2001/0032057 | A1 | 10/2001 | Smith et al. |
| 2006/0007170 | A1 * | 1/2006 | Wilson et al. .................. 345/173 |
| 2008/0025612 | A1 * | 1/2008 | Wang et al. .................... 382/188 |
| 2008/0150909 | A1 * | 6/2008 | North et al. .................... 345/173 |
| 2008/0192017 | A1 * | 8/2008 | Hildebrandt et al. ......... 345/173 |
| 2008/0316184 | A1 * | 12/2008 | D'Souza ........................ 345/173 |
| 2009/0109195 | A1 * | 4/2009 | Kent et al. ..................... 345/178 |
| 2010/0115145 | A1 * | 5/2010 | Banerjee et al. ................ 710/10 |

FOREIGN PATENT DOCUMENTS

| CA | 2367864 | 4/1993 |
| CA | 2367864 A1 | 4/1993 |
| EP | 1607853 | 12/2005 |
| GB | 2450195 A | 12/2008 |

OTHER PUBLICATIONS

Interwrite Learning, "Getting Started—Interwrite Board" 2007; http://www.interwritelearning.com/pdf/Interwrite%20Board%20Getting%20Started.pdf[Accessed Feb 18, 2009], see pp. 22, 23 and 29.
Combined Search and Examination Report under Sections 17 & 18(3), Appl. No. GB0819310.4, Feb. 19, 2009.
Extended European Search Report in European Patent Application No. 09173678, mailed on Apr. 2, 2014.

* cited by examiner

*Primary Examiner* — Tadeese Hailu
(74) *Attorney, Agent, or Firm* — Brient Globerman, LLC

(57) ABSTRACT

There is provided a method of controlling a computer system of an interactive display system, comprising: predetermining one or more positions on an interactive display of the interactive display system; displaying an image representing the predetermined one or more positions; receiving data identifying one or more detected positions selected on the interactive display; comparing the detected positions and the predetermined positions, wherein in dependence on a match the computer system registers the interactive display with the computer systems.

12 Claims, 8 Drawing Sheets

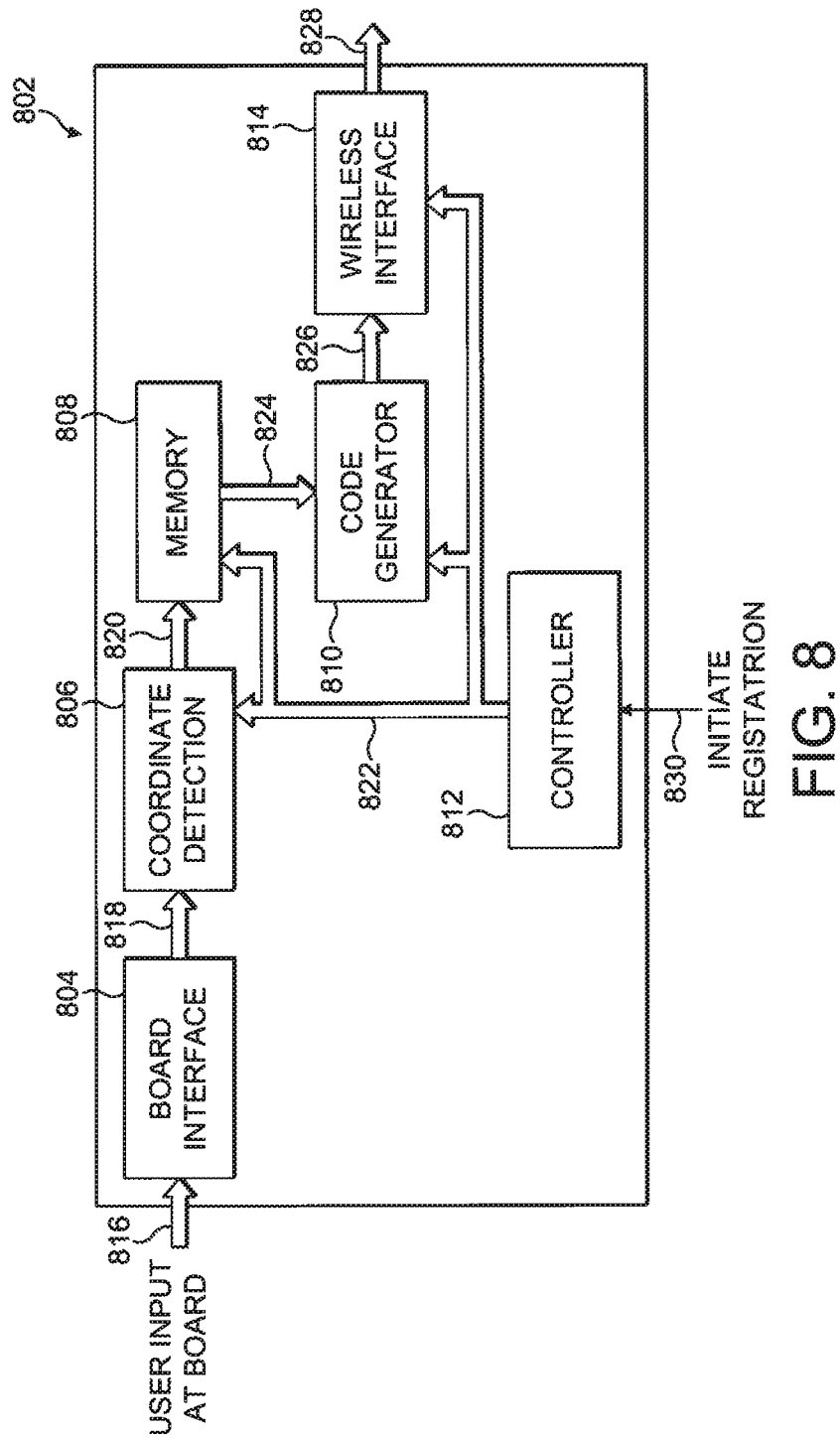

REGISTRATION FOR INTERACTIVE WHITEBOARD

BACKGROUND TO THE INVENTION

1. Field of the Invention

The invention relates to the registration of a display part of an interactive display system with a control part of such system. The invention is particularly, but not exclusively, concerned with the registration of a wireless interactive whiteboard.

2. Background to the Invention

A typical example of an interactive display system is an electronic whiteboard system. An electronic whiteboard system typically is adapted to sense the position of a pointing device or pointer relative to a working surface of the whiteboard, the working surface being an interactive surface. When an image is displayed on the work surface of the whiteboard, and its position calibrated, the pointer can be used in the same way as a computer mouse to manipulate objects on the display by moving a pointer over the surface of the whiteboard.

A typical application of an interactive whiteboard system is in a teaching environment. The use of interactive whiteboard improves teaching productivity and also improves student comprehension. Such whiteboards also allow use to be made of good quality digital teaching materials, and allow data to be manipulated and presented using audio visual technologies.

A typical construction of an electronic whiteboard system comprises an interactive display forming the electronic whiteboard, a projector for projecting images onto the display, and a computer system in communication with the electronic whiteboard for generating the images for projection, running software applications associated with such images, and for processing data received from the display associated with pointer activity. In this way the computer system can control the generation of images to take into account the detected movement of the pointer on the interactive surface.

In prior art electronic whiteboard systems, the connection between the whiteboard and the computer system is typically provided by a wired connection. In order to simplify the installation of electronic whiteboard systems, and to make such systems more versatile, it is proposed to provide the connection between the electronic whiteboard and an associated computer system wirelessly.

In a wireless arrangement, a problem arises in establishing registration between the electronic whiteboard and the computer system. Whereas in a wired arrangement on power-up the whiteboard and the computer system are directly connected, and therefore the relationship between the two is effectively predefined, in a wireless system there is no dedicated connection between the computer and the whiteboard on power-up.

A further problem arises due to a typical environment in which an electronic whiteboard is used. As mentioned above, a typical application is in a teaching environment. In a teaching environment, a plurality of electronic whiteboards may be provided in a relatively small area, such as a plurality of whiteboards dispersed among a number of closely located classrooms. When a number of such whiteboards are positioned within the same locality, and such whiteboards are adapted to wirelessly communicate with computer systems, an additional complexity arises in establishing registration between computers located in the individual classrooms and the whiteboards in those classrooms. A computer can wirelessly communicate as easily with a whiteboard in any other classroom as that in the particular classroom in which it is located. An additional problem therefore arises in ensuring correct registration between a plurality of whiteboards and a plurality of computer systems in such a wireless environment.

It is an aim of the invention to provide an improved registration system for interactive systems, which is particularly advantageous in the registration of wireless interactive systems, and which preferably addresses one or more of the above-stated problems.

SUMMARY OF THE INVENTION

In one aspect the invention provides a method of establishing communication between a computer system and an interactive display, comprising: storing, at said computer system a code corresponding to a sequence of positions on an interactive surface; detecting, at said interactive surface, selection of a sequence of positions on said surface; transmitting a code, from the interactive surface, corresponding to the sequence of detected positions; comparing, at the computer, the stored codes and the transmitted code; wherein in determination of a match, the interactive display is registered with the computer.

The communication between the computer system and the interactive display is preferably wireless.

The method may further comprise the steps of: displaying a plurality of points on the interactive surface, wherein the points are displayed at the sequence of positions. The points may be displayed with a sequence indicator, the step of detecting including detecting the sequence order, and the stored code further corresponding to an order of sequence positions.

The method may further comprise in dependence on determination of a match, calibrating the interactive surface and the computer in dependence on the transmitted code and the stored code.

In an aspect the invention provides a method of establishing communication between an interactive display and a computer system, comprising: detecting one or more inputs at the interactive display; comparing the detected one or more inputs to a predetermined one or more inputs at the computer system; and in dependence on a match, registering the interactive display and the computer system.

The step of detecting one or more inputs at the interactive display may include detecting the position of the one or more inputs on the interactive display.

The step of detecting more than one input at the interactive display may include detecting the sequence of the inputs on the interactive display.

Data corresponding to the predetermined one or more inputs may be used to generate a displayed image.

The displayed image may be displayed on the interactive display.

The step of comparing may comprise determining if the detected one or more positions of the detected one or more inputs correspond to one or more predetermined positions on the interactive display.

The step of comparing may comprise determining if a sequence of detected positions of more than one detected inputs correspond to a predetermined sequence of more than one predetermined position on the interactive display.

Responsive to a match the displayed image may be calibrated using the detected one or more inputs.

The displayed image may be displayed on a display of the computer system.

The step of comparing may comprise determining if the detected one or more positions of the detected one or more inputs correspond to one or more predetermined areas of the interactive display.

The step of comparing may comprise determining if the sequence of detected positions of more than one detected inputs correspond to the predetermined sequence of more than one predetermined areas on the interactive display.

Responsive to a match the displayed image may be calibrated in a subsequent calibration process.

In dependence on whether a predetermined sequence of positions or a predetermined sequence of areas is matched, the computer systems may use the detected inputs at the interactive display to calibrate the displayed image.

The step of detecting one or more inputs at the interactive display may further include transmitting the data corresponding to the detected one or more inputs.

The step of comparing may further include receiving the data corresponding to the detected one or more inputs at the computer system.

The step of comparing may further include storing the data corresponding to the predetermined one or more inputs at the computer system.

In an aspect of the invention there is provided a method of controlling a computer system of an interactive display system, comprising: predetermining one or more positions on an interactive display of the interactive display system; displaying an image representing the predetermined one or more positions; receiving data identifying one or more detected positions selected on the interactive display; comparing the detected positions and the predetermined positions, wherein in dependence on a match the computer system registers the interactive display with the computer systems.

The step of predetermining may comprise predetermining a plurality of positions, and predetermining a sequence of said plurality of positions, and the step of receiving comprises receiving data identifying a plurality of detected positions, and a sequence of said detected positions, wherein the comparing step further includes comparing said sequences.

The step of displaying may include displaying the images on the interactive display, wherein responsive to a match the displayed image is calibrated in dependence upon the detected positions.

In another aspect the invention provides an interactive display system including a computer system and an interactive display, comprising: a memory in said computer system for storing a code corresponding to a sequence of positions on an interactive surface; a detector at said interactive surface of detecting selection of a sequence of positions on said surface; a transmitter, at the interactive surface, for transmitting a code corresponding to the sequence of detected positions; a comparator, at the computer system, for comparing stored codes with a code received from the transmitter of the interactive surface; and a controller at the interactive display for completing registration with the computer and determination of a match.

In another aspect the invention provides an interactive display system including a computer system and an interactive display, comprising: means for detecting one or more inputs at the interactive display; means for comparing the detected one or more inputs to a predetermined one or more inputs at the computer system; and means for, in dependence on a match, registering the interactive display and the computer system.

The means for detecting one or more inputs at the interactive display may include means for detecting the position of the one or more inputs on the interactive display.

The means for detecting more than one input at the interactive display may include means for detecting the sequence of the inputs on the interactive display.

The system may include display means, wherein data corresponding to the predetermined one or more inputs is used to generate a displayed image.

The displayed image may be displayed on the interactive display.

In another aspect there is provided a computer system of an interactive display system, comprising: means for predetermining one or more positions on an interactive display of the interactive display system; means for displaying an image representing the predetermined one or more positions; means for receiving data identifying one or more detected positions selected on the interactive display; and means for comparing the detected positions and the predetermined positions, wherein in dependence on a match the computer system registers the interactive display with the computer systems.

The means for predetermining may comprise means for predetermining a plurality of positions, and predetermining a sequence of said plurality of positions, and the means for receiving comprises means for receiving data identifying a plurality of detected positions, and a sequence of said detected positions, wherein the means for comparing further includes means for comparing said sequences.

The means for displaying may include means for displaying the images on the interactive display, wherein responsive to a match the displayed image is calibrated in dependence upon the detected positions.

BRIEF DESCRIPTION OF THE FIGURES

The invention will now be described by way of example with reference to the accompanying figures, in which:

FIG. 8 illustrates schematically the functional blocks for the controller of the interactive display to enable the process of FIG. 7.

DESCRIPTION OF THE PREFERRED EMBODIMENTS

The invention is now described by way of reference to various examples and embodiments, and advantageous applications. One skilled in the art will appreciate that the invention is not limited to the details of any described example or embodiment. In particular the invention is described with reference to an exemplary interactive display system, and one skilled in the art will appreciate that the principles of the invention are not limited to the specifics of such a described arrangement.

Figure 1:
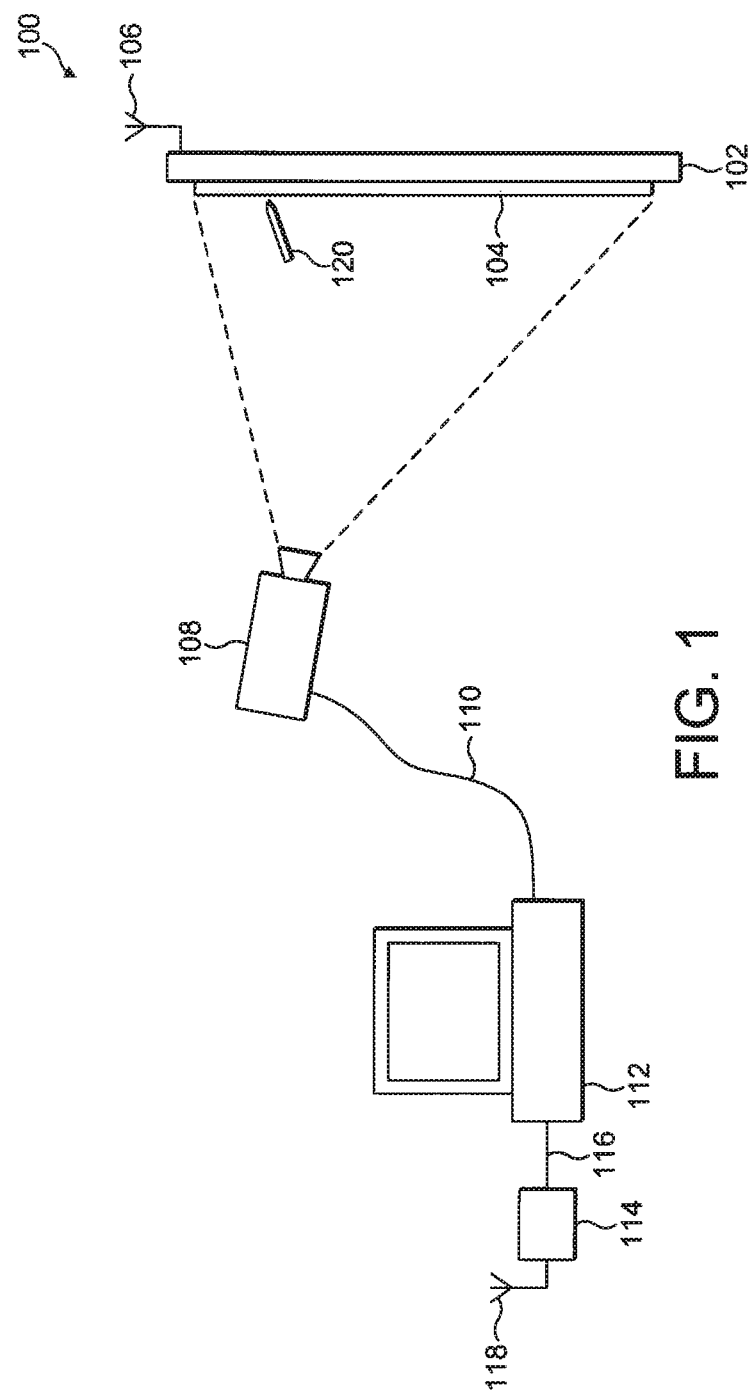
FIG. 1 illustrates the key elements of a typical known interactive display system.

With reference to FIG. 1, an exemplary interactive display system comprises: a whiteboard assembly arrangement generally designated by reference numeral 102, and having an interactive display area designated by reference numeral 104; a projector 108; a computer system 112; and a hub 114.

The whiteboard assembly arrangement 102 is adapted to wirelessly communicate with the computer system 112. For this purpose the whiteboard assembly arrangement is provided with a wireless communication means, such as an antenna as designated by reference numeral 106. The hub 114 is connected to the computer system 112 via a communication link 116. The hub 114 is provided to perform the functionality of a communication hub for the interactive display system. The hub 114 is provided with a wireless communication means, as denoted by antenna 118, for wireless communication with the whiteboard assembly arrangement 102. It should be noted that whilst in the exemplary arrangement of FIG. 1 the wireless hub 114 is provided as an entity connected to the computer system, in alternative arrangements the functionality of such a hub may be implemented within the standard functionality of the computer system 112, in accordance with the software application running on the computer system 112. In a particularly preferred arrangement, the hub 114 is connected to the computer system 112 via a USB (universal serial bus) connection. The hub 114 may comprise a USB client, wireless transceiver electronics, registration and communication software located in firmware and flash memory. However the registration software typically runs on the computer.

In addition to a wireless communication established between the computer system 112 and the whiteboard assembly arrangement 102, the computer system 112 is connected via a data link 110 to the projector 108. This is preferably a wired link. The computer system 112 provides images for display to the projector 108 in this way, the projector projecting images onto the interactive display surface 104 of the whiteboard assembly arrangement 102.

In addition there is shown in FIG. 1 a pointer or pointing device 120. In a preferred arrangement the pointer 120 is a pen-shaped device, which is adapted to interact with the interactive display surface 104. Thus a user holds the pointer 120, and moves it around the interactive display surface. In one particularly advantageous application the interactive display surface 104 is an electromagnetic surface, and the pointer 120 is an electromagnetic pointer. It should be noted that other arrangements for allowing a user to interact with the interactive display surface are envisaged. In alternative arrangements, for example, the interactive display surface 104 may be a touch-sensitive surface, and the pointer 120 may simply be a finger of a user.

The pointer 120 is moved across the interactive display surface 104 of the whiteboard assembly arrangement 102, in contact with or close to the surface. The position of the pointing device 120 relative to the surface 104 is detected by the interactive display surface 104 and associated electronics. The pointer 120 may be moved around the display surface 104 to, for example, write on the display surface, highlight images displayed on the display surface, select icons and menu options displayed on the display surface etc. The use of such a pointer in combination with a whiteboard assembly arrangement is well-known to one familiar with the art.

Using methods known in the art, the pointer 120 can function in the same way as a computer mouse. The pointer may be provided with buttons or such like which may be depressed, to provide for functional operations in much the same way as buttons may be provided on a computer mouse.

Figure 2:
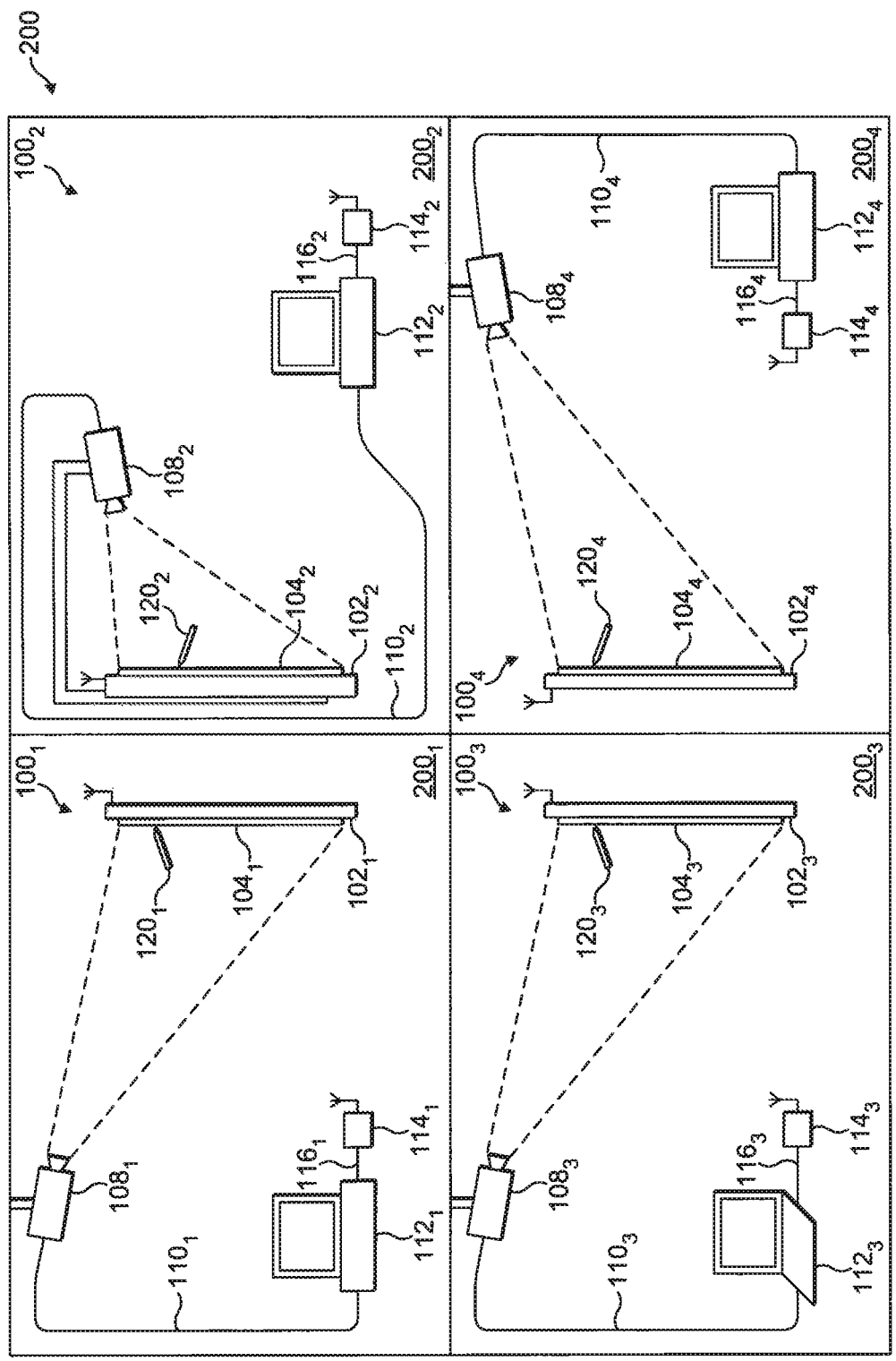
FIG. 2 illustrates an implementation scenario in which a plurality of wireless interactive display systems are deployed in close proximity.

With reference to FIG. 2, there is illustrated a typical environment in which an interactive display system such as that illustrated in FIG. 1 may be implemented. In FIG. 2 there is generally illustrated a building environment denoted by reference numeral 200, and comprising four rooms denoted by reference numerals $200_1$ to $200_4$. Each room comprises an interactive display system such as the interactive display system 100 of FIG. 1. Where reference numerals correspond to elements illustrated in FIG. 1, like reference numerals are used in FIG. 2, with appropriate subscript designation. Thus each of the rooms $200_1$ to $200_4$ (which can be considered to be classrooms in a teaching environment), include a corresponding interactive display system $100_1$ to $100_4$. Each of the display systems is similar to that of FIG. 1. With respect to the interactive display systems $100_2$ illustrated in FIG. 2, there is shown a slightly alternative arrangement in which the projector 108 is shown as mounted integrally to the whiteboard assembly arrangement 102 by virtue of a "boom", rather than being connected to the ceiling as illustrated in the system 100 of FIG. 1 and the systems $100_1$, $100_3$ and $100_4$ of FIG. 2.

With reference to FIG. 2, there can be understood the potential issues which arise in registering an electronic whiteboard which is wirelessly adapted. As can be seen in the example of FIG. 2, there is provided four wireless electronic whiteboards in close proximity. This means that the computer system of any given one of the four systems, will potentially be able to receive signals wirelessly from all of the four whiteboards. However it is necessary for each individual computer system to establish a registration with an individual whiteboard, specifically the computer system and whiteboard in the same classroom should be registered together. In accordance with the invention, there is provided an advantageous technique for ensuring proper registration of whiteboard-computer pairs. In the following description the invention will be described with reference to a single interactive whiteboard system, specifically the interactive whiteboard system 100 of FIG. 1.

The invention is now described with reference to the operation of the computer system 112 of FIG. 1, which for the purposes of simplifying an illustrative example is assumed to provide all wireless and computer functionality which may otherwise be associated with the wireless hub 114. It should be noted that whilst the computer system 112 of FIG. 1 is illustrated as a desktop-type computer system, other types of computer system may be envisaged. The computer system may, for example, be a dedicated computer system associated with the interactive whiteboard system, or may be a personal data assistant (PDA) running the appropriate application software, or a mobile telephone device. In general the functionality of the hub 114 may be provided by any device having the appropriate processes/control capabilities required to facilitate communication between the computer system and the wireless interactive board.

Figure 3:
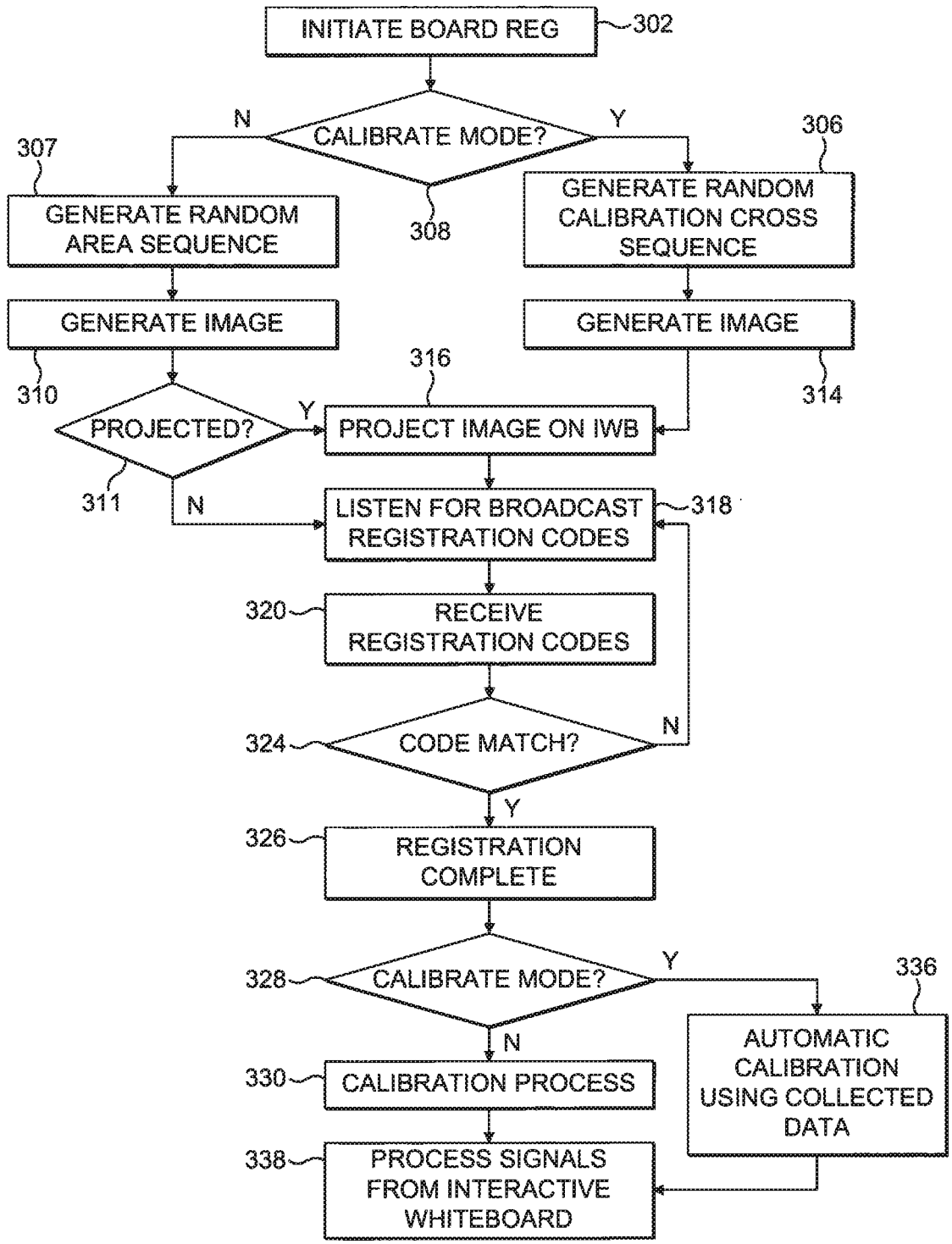
FIG. 3 illustrates a process flow for implementing a registration scheme in a controller of an interactive display system in accordance with embodiments of the invention.

With reference to FIG. 3 there is illustrated the process steps performed in the computer system 112 (incorporating the functionality of the hub 114) in accordance with embodiments of the invention.

Figure 4:
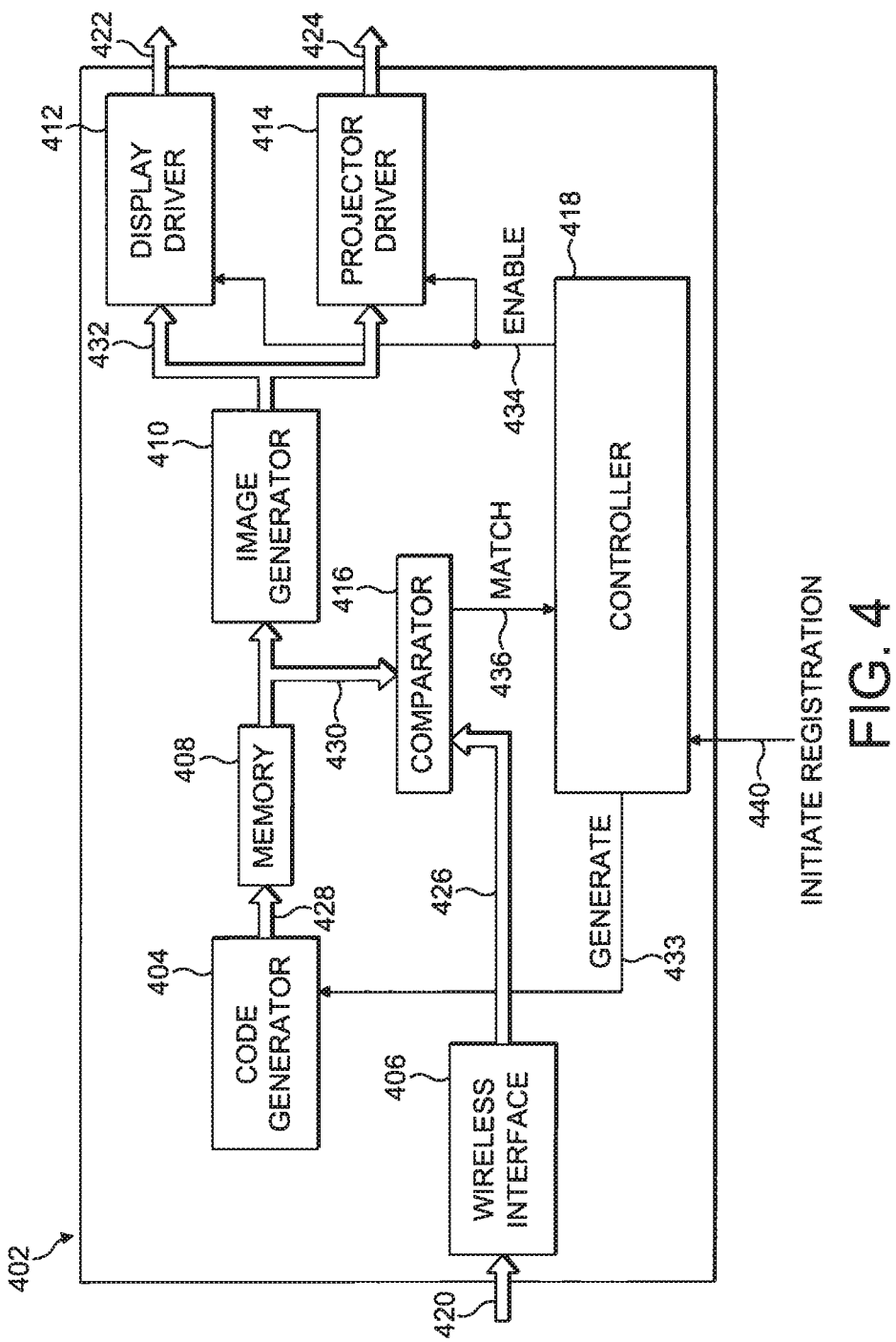
FIG. 4 illustrates schematically the functional blocks of a controller of an interactive display system for implementing the process of FIG. 3 in an embodiment.

With reference to FIG. 4 there is illustrated the functional elements of the computer system 112 required to implement the process steps in accordance with embodiments of the invention. With reference to FIG. 4, the computer system 112 functionality 114 is generally designated by reference numeral 402. The functional elements include a wireless interface 406, a code generator 404, a memory 408, a comparator 416, an image generator 410, a display driver 412, a projector driver 414, and a controller 418. Any one of the functional blocks illustrated in FIG. 4 may be combined in one or more other functional blocks. The functional elements required for the implementation of embodiments of the invention are shown in FIG. 4, and further functional blocks may be required for a full implementation of the computer system functionality.

Figure 7:
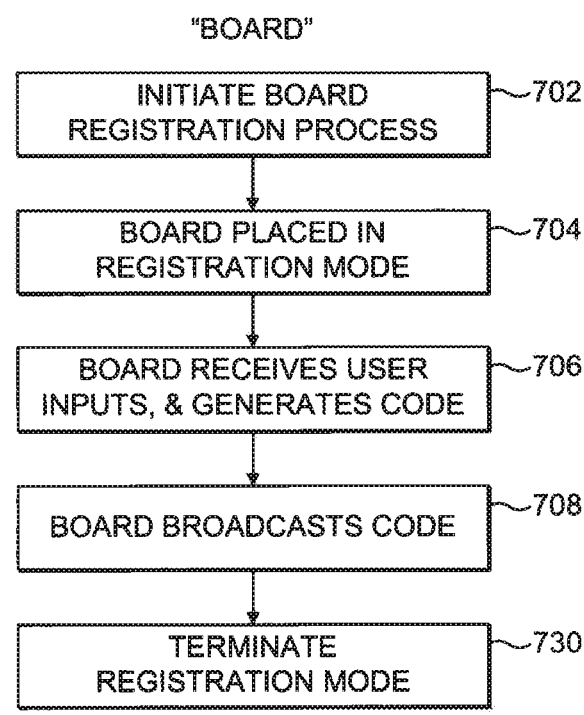
FIG. 7 illustrates the process flow of a controller of the interactive surface in embodiments of the invention.

With reference to FIG. 7 there is illustrated the flow process for implementing embodiments of the invention in the whiteboard assembly arrangement 102. FIG. 8 illustrates the functional blocks required in the whiteboard assembly arrangement 102 for implementation of the flow process of FIG. 7. One or more of the functional blocks of FIG. 8 may be combined in one or more further functional blocks. The whiteboard assembly arrangement 102 may require additional functional elements in order to fully operate the interactive whiteboard system.

The operation of the registration of an interactive whiteboard with a computer system in accordance with embodiments of the invention is now described.

With reference to FIG. 3, in a step 302 a board registration mode is initiated at the computer system. This may be initiated automatically upon launching a software application associated with the operation of the interactive system. As illustrated in FIG. 4, on initiation of the registration process, an INITIATE REGISTRATION signal is set on line 440 to the controller 418.

In the examples below an assumption is made that the computer system only sends display data to the projector once the registration process starts. This is for illustration purposes only. In practice the projector is constantly fed from the output of a standard graphics card within a computer system.

Responsive to initiation of the board registration process, a registration mode is enabled by the controller 418.

In step 308 of FIG. 3, a determination is made as to which mode of registration is enabled. In embodiments of the invention, registration may take place in either a 'calibration mode' or 'non-calibration' mode.

In a non-calibration mode of registration, an image may or may not be projected to the interactive display surface 104. In calibration mode, an image is always displayed to the interactive display surface 104.

If in step 308 it is determined that calibration mode is enabled, then the process moves on to step 306.

A registration code is generated in step 306. In order to generate the registration code, the controller 418 sets a GENERATE control signal on line 438 to the code generator 404. The generation of a code in this step is preferably by way of a random code generator. The nature of the code generated, and the complexity of the code, will be implementation-dependent. The purpose of the code is to be used to provide a particular interaction sequence for display either on a display associated with the computer system 112 or to be projected onto the interactive display surface 104, as will be described further hereinbelow. Thus the specific generation of the code, and its complexity, will be dependent upon the image which it is desired to be displayed.

Responsive to the GENERATE control signal on line 438, the code generator 408 generates an appropriate code on lines 428 which is delivered to the memory 408. The code is then stored in the memory 408.

In step 314 the image generator 410 generates an image in dependence upon the code stored in the memory 408 which is provided on outputs 430. The controller controls the projector driver 414 with an ENABLE signal on line 434; such that the projector driver 414 receives the generated image on output lines 432 of the image generator 410, and sends drive signals on lines 424 to the projector 108. As a result an image is projected onto the interactive display surface 104, which image is generated in dependence upon the generated registration code. The projection of the image to the interactive display surface is denoted by step 316.

Figure 6:
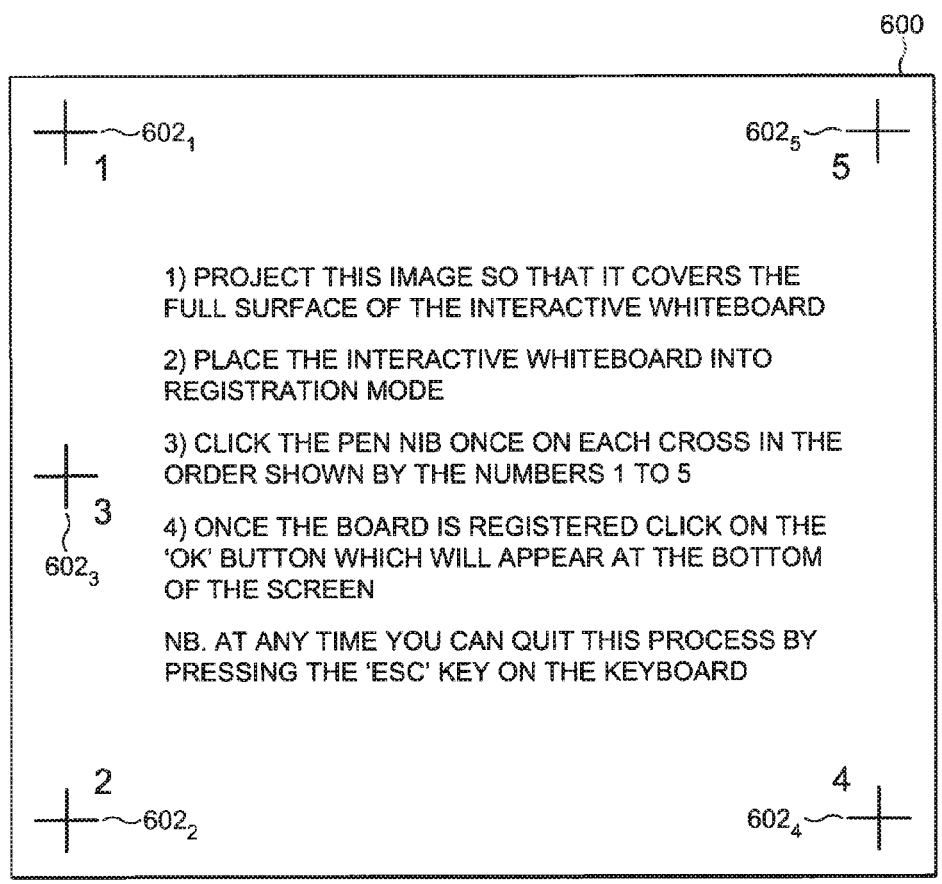
FIG. 6 illustrates the display projected under the control of the controller of FIG. 4 to the interactive display in an embodiment.

With reference to FIG. 6, there is illustrated an exemplary displayed image in the calibration mode of operation. With reference to FIG. 6, reference numeral 600 generally designates the image displayed on the interactive display surface. As can be seen in FIG. 6, in the exemplary arrangement a plurality of crosses are displayed at distributed points across the interactive display surface. As shown five crosses, denoted by reference numerals $602_1$ to $602_5$, and being numbered 1 to 5, are displayed on the interactive display surface in the exemplary arrangement.

If it is determined in step 308 that a non-calibration mode of registration is in operation, then in step 307 a registration code is generated, being a random area sequence code rather than a calibration cross sequence code.

In step 310 the image is generated in dependence upon the code, the ENABLE signals on line 434 enabling the display driver 412 to receive the generated image on lines 432 at the output of the image generator 410, and provide those to the display associated with the computer system 112 on lines 422.

In a step 311 it is determined if the image is to be displayed on the whiteboard. If not, an image is displayed only on the computer system display.

Figure 5:
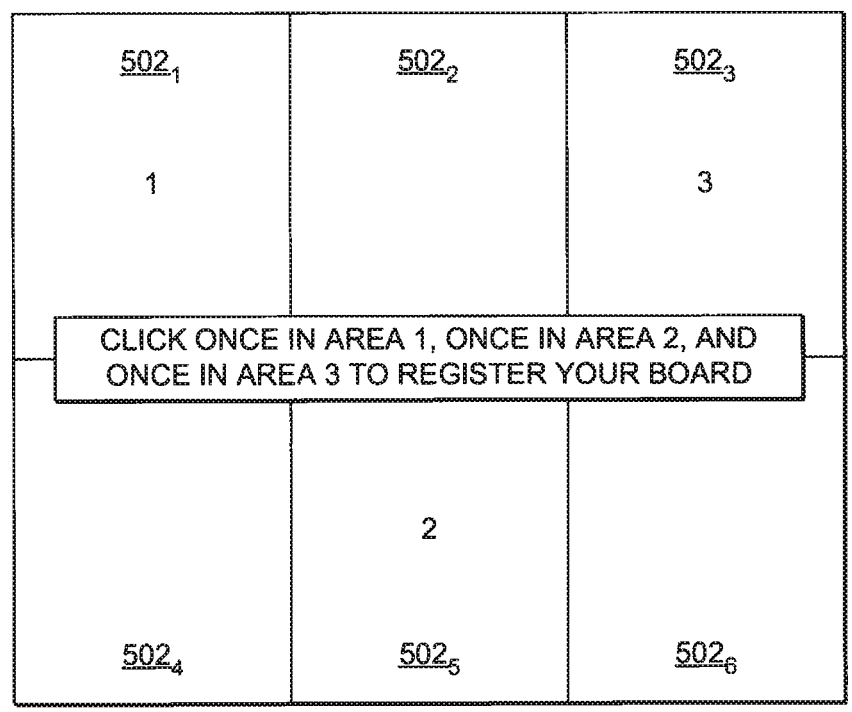
FIG. 5 illustrates the display of a computer system associated with the controller of FIG. 4 in an embodiment.

With reference to FIG. 5, there is illustrated the display of an image on the computer system display in an exemplary arrangement in the non-calibration mode of operation. In the exemplary arrangement, the display generally denoted by reference numeral 500 is partitioned into six sections, denoted by reference numerals $502_1$ to $502_6$. In one or more of the sections, sections $502_1$, $502_3$ and $502_5$ in FIG. 5, there is a number presented.

The purpose of the display arrangements of FIGS. 5 and 6 in the respective calibration and non-calibration modes of registration will now be further described with reference to the operation of the control process in the interactive whiteboard. With reference to FIG. 7, in a step 702 the interactive whiteboard is placed in a registration mode of operation at or around the same time as the computer system is placed in registration mode. The interactive whiteboard may be placed in registration mode on power-up automatically, or may be provided with a physical input element such as a button which can be selected in order to enable registration mode.

The functional blocks of the controller of the whiteboard assembly arrangement are denoted by reference numeral 802 in FIG. 8, and include a board interface 804, a coordinate detection block 806, a memory 808, a code generator 810, a controller 812, and a wireless interface 814.

As illustrated in FIG. 8, initiation at the board of the registration process in step 702 results in an INITIATE REGISTRATION control signal being received by the controller 812 on line 830. Responsive thereto, the controller 812 operates to control the registration mode of operation within the whiteboard assembly arrangement. As denoted by step 704, following this initialisation the whiteboard is placed in a registration mode.

In the registration mode, the whiteboard is adapted to sense or detect the presence of the pointer on the interactive display surface, in both non-calibration registration and calibration mode registration. The interactive whiteboard system may be adapted to detect a predetermined number of pointer interactions with the interactive surface, to detect all pointer interactions within the interactive surface in a particular time period, detect a sequence of pointer interactions with the interactive display surface, or a combination of all.

In the calibration mode of operation, as discussed above a display as illustrated in FIG. 6 is displayed to the interactive surface. As part of the registration process, a user is then required to place the pointer on each of the crosses $602_1$ to $602_5$ displayed on the interactive display surface. Preferably, the user is required to place the pointer on the crosses in their numbered sequence, i.e. the user must first place the pointer on the first cross denoted by reference numeral $602_1$, and then each further cross in sequence.

Thus in the example of FIG. 6, the user is required to provide five inputs at specific locations on the interactive display system as part of the registration process.

The board interface block 804 of FIG. 8 receives the user inputs from the board on lines 816, after processing by appropriate coordinate detection technology. The point of contact detected at the interactive display surface is shown in FIG. 8 as being forwarded from the board interface block 804 to a coordinate detection block 806 via a communication line 818, and thereafter being transferred into a memory 808 on a communication line 820. Thus the memory 808 may store information associated with the interaction between the pointer and the interactive surface during registration.

In the example of FIG. 6, the controller 812 of FIG. 8 is adapted such that once five coordinates have been detected, i.e. five distinct contacts between the pointer and the interactive surface are detected, the five sets of coordinate information are transferred from the memory 808 to the code generator 810 on communication lines 824. As illustrated in FIG. 8 there is generally provided a set of control connections on lines 822 between the controller and each of the coordinate detection block 806, the memory 808, the code generator 810, and the wireless interface block 814.

Thus the code generator 810 receives five sets of coordinate information, together with information in respect of the sequence in which such coordinates were detected. In dependence upon this information, the code generator 810 generates a code on output lines 826 to the wireless interface 814.

It will be understood that the code generator 810 operates in a complementary manner to the code generator 404 of FIG. 4. That is each of the code generators in the whiteboard and the computer system operates to use a complementary technique to generate an image or sequence of images in dependence upon a code, or to retrieve a code in dependence upon detected inputs which are input as a result of interaction with a displayed image.

Thus, it can be understood that the crosses projected to the interactive display as shown in FIG. 6, are generated in dependence upon a random code generated at the computer system or its associated hub. The interactive display system then detects pointer activity which follows the displayed image, and which then converted back into code should correspond to the code originally generated at the computer system. By comparing the code generated responsive to the user inputs at the interactive display, with the code originally generated by the computer system, the presence of a match can be determined, and registration therefore established.

As illustrated in FIG. 6, in addition to the projected crosses there is preferably projected instructions to the user for carrying out the calibration process. Thus the user may be instructed to ensure that the projection of the image is such that it covers the full surface of the interactive whiteboard. The user may be instructed to initiate the registration mode on the interactive whiteboard. The user may then be instructed to select each cross in the ordered numbers shown by placing the pointer on the cross. The user may then be instructed to select a subsequently displayed icon on the screen which will appear only when registration is complete.

The calibration mode of operation requires that the image is displayed accurately on the whiteboard, because it is used for the calibration process as well. It should be noted that in this calibration mode of registration, it may well be that the positions displayed on the interactive whiteboard for the crosses may be fixed, and the order in which they are to be selected is varied. That is, the random code generator merely determines what sequence should be used, rather than the positions of the crosses. Alternatively the positions of the crosses may be varied as part of the random code generation sequence. However in a preferable embodiment the position of the crosses is hard coded and fixed.

In a non-calibration mode of registration, the operation differs as follows.

In the non-calibration mode of operation, as discussed above a display as illustrated in FIG. 5 is displayed to the display of the computer system 112 (or the interactive display). As part of the registration process, a user is then required to place the pointer on a part of the interactive display surface 104 corresponding approximately, in relation to the interactive display, to where the numbers of the number sequence are displayed in relation to the computer system display. Preferably, the user may be required to place the pointer anywhere in an area in which the number of the sequence is displayed, e.g. area $502_1$. In the example of FIG. 5, the display is split into six areas, but may be split into more or less areas. The area to be selected may be, indicated by other means, for example by being displayed in a different colour. The number of locations which the user must select, and thus the number of locations displayed on the display 500, will be implementation dependent. In a simple system, it may be sufficient for one pointer location to be utilised, in other implementations a larger number of pointer locations may need to be selected. The chosen implementation may be dependent upon the number of wireless systems operating in proximity.

Thus in the example of FIG. 5, the user is required simply to provide three inputs on the interactive display system as part of the registration process, in general areas in a specified sequence.

As noted above, in the non-calibration mode of operation there is no requirement to project any images onto the interactive whiteboard, although the images may be projected. However in a typical operation in this mode, the computer display of the computer system will display the image as illustrated in FIG. 5.

As illustrated in FIG. 5, the display may additionally include instructions to the user as to what they are required to do to achieve registration.

It should be noted that for the arrangement of FIG. 5, and also for the arrangement of FIG. 6, that the sequence for a particular registration process is random, and on other interactive whiteboard systems displayed in other rooms a different sequence will be displayed.

In an arrangement, the sequence may be identified in both calibration modes and non-calibration modes. For example the display of FIG. 6, with crosses at certain locations, may be displayed in both modes. Whereas in calibration mode the user must select the crosses, in non-calibration mode the user must select the regions of the display in which the crosses are displayed (e.g. by making approximate selections on the whiteboard based on crosses displayed on the computer screen.

The board interface block 804 of FIG. 8 receives the user input(s) from the board on lines 816, after processing by appropriate coordinate detection technology. The point of contact detected at the interactive display surface is shown in FIG. 8 as being forwarded from the board interface block 804 to a coordinate detection block 806 via a communication line 818, and thereafter being transferred into a memory 808 on a communication line 820. Thus the memory 808 may store information associated with the interaction between the pointer and the interactive surface during registration.

In the example of FIG. 5, the controller 812 of FIG. 8 is adapted such that once three coordinates have been detected, i.e. one distinct contact between the pointer and the interactive surface is detected, the coordinate information is transferred from the memory 808 to the code generator 810 on communication lines 824.

Thus the code generator 810 receives the set(s) of coordinate information (together with information in respect of the sequence in which such coordinates were detected, if appropriate). In dependence upon this information, the code generator 810 generates the code on output lines 826 to the wireless interface 814.

The step of generating the code in dependence upon the detected coordinate(s) (and optionally the input sequence) is the same for both the calibration mode and non-calibration mode, and is denoted by step 706 in FIG. 7. After generation of the code, as denoted by step 728, the wireless interface 814 transmits the generated code, using a suitable protocol, on the air interface as represented by communication link 828.

Thereafter, in a step 730 the whiteboard may terminate the registration state. Alternatively, the whiteboard may remain in the registration state for a fixed time, or the registration state may be determined by some other control.

In transmitting the code on the air interface, the whiteboard transmits a message containing the code in accordance with known techniques. This message includes a header including an identifier which uniquely identifies the whiteboard. Thus any device adapted to receive wireless transmissions can uniquely identify the whiteboard from which a transmitted message originates. The generation and transmission of wireless messages is well-known to one-skilled in the art, and outside the scope of the invention.

Referring again to FIGS. 3 and 4, after the display or projection steps, the computer system enters into a state in which it listens for broadcasts from wireless whiteboards. This is denoted by step 318. More specifically, the computer system listens for registration messages from the wireless whiteboards.

The computer system receives a broadcast registration message on the air interface 420 at the input to the wireless interface 406. The wireless interface 406 of FIG. 4 is assumed to include functionality for decoding and identifying received messages.

As denoted by step 320, when the wireless controller identifies receipt of a broadcast registration message, the registration code contained therein is extracted and output on communication lines 426.

The randomly generated registration code generated in step 306, is then retrieved from the memory and output on communication lines 430.

The comparator 416 receives as one input the received generated registration code on line 430. As denoted by step 324, the comparator then determines whether such codes match.

In the event that the codes do not match, the process of FIG. 3 returns to step 318, and the hub continues to listen for registration broadcasts.

In the event that the codes do match, the comparator 416 sets a signal MATCH on line 436 which is received by the controller, which informs the controller that a match has been identified.

As denoted by step 326, at this stage registration is then complete: the whiteboard 102 is registered with the hub/computer system 114/112.

In a further optional step 328, the controller 418 then determines again whether the registration took place in calibration mode or non-calibration mode.

If the registration took place in non-calibration mode, then in accordance with known procedures, before accurate interactive operation can occur a calibration process is required, to calibrate the pointer and displayed image. Thus, in step 330, a calibration process takes place. Such calibration processes are well-known in the art, and outside the scope of this invention.

If it is determined in step 328 that the registration took place in calibration mode, then in a step 336 the pointer position and displayed image are calibrated, using known calibration techniques, based on the coordinate data retrieved during the registration process.

Thus, in accordance with a preferred aspect of the invention, calibration mode is active during registration mode, and the data acquired to achieve registration is also used to achieve calibration in step 336. It should be understood that the sequence of the calibration step 336 in FIG. 3 is purely illustrative, and in calibration mode the calibration may take place as soon as registration is confirmed by way of a code match in step 324. Such an arrangement is particularly efficient.

Following the calibration in either step 330 or 336, in a step 338 interactive operation continues in accordance with known techniques.

If an interactive whiteboard is adapted, in a preferred embodiment, to offer both calibration mode and non-calibration mode registration, then it is preferably further adapted to allow selection of one or the other mode. In an example implementation, two buttons may be provided on the board, one for each mode. The buttons may be selected using the pointing device.

Alternatively the number of inputs required for registration could be made to be the same for both modes. The controlling software may then decide whether to use the data for calibration or not in dependence upon whether the detected sequence matches a displayed sequence of crosses accurately or approximately. That is, if the detected sequence is determined to be good enough, calibration mode is assumed. If the detected sequence corresponds only to a correct sequence of regions in which the crosses where displayed, non-calibration mode is assumed.

If only one mode is offered, then that mode could be hard-coded into the board at manufacture.

It should be noted that although the description herein is presented in the context of an interactive display system incorporating a whiteboard assembly arrangement, the invention is not limited to such. The invention generally applies to interactive input/output devices, which may include, for example, graphics tablets such as may be used in interactive display systems. The invention may generally be used with any type of interactive display adapted to interact with a pointing device.

It should be further noted that whilst the embodiments of the invention are disclosed in the context of an interactive system including a projector, the invention is not limited to interactive projector systems. The invention and its embodiments may also be utilised in interactive systems using other display technology, such as emissive technology, e.g. an interactive plasma television.

Still further, whilst the invention is described in the context of a wireless system, and is particularly advantageous when implemented in a wireless system, it is not so limited. The invention may be used in any environment where there is a need to associate an interactive display with a computer system, and whilst this particularly is required in wireless arrangements, there may be other arrangements, such as where multiple interactive displays and multiple computer systems are connected on a public wired network, where the invention may be advantageously implemented.

The methods described hereinabove may be implemented on computer software running on a computer system. The invention may therefore be embodied as a computer program code being executed under the control of a processor of a computer system. The computer program code may be stored on a computer program product. A computer program product may include a computer memory, a portable disk or portable storage memory, or hard disk memory.

The invention is described herein in the context of this application to a computer system forming part of an interactive display system. It will be understood by one skilled in the art that the principles of the invention, and the embodiments described herein, are not limited to any specific interactive display system. The principles of the invention and its embodiments may be implemented in any interactive display system. The invention and its embodiments is not limited to the use of a pointer in combination with an interactive display system, and the invention and its embodiments equally apply to arrangements in which a touch-type surface arrangement is provided for the interactive display.

The invention has been described herein by way of reference to particular examples and exemplary embodiments. One skilled in the art will appreciate that the invention is not limited to the details of the specific examples and exemplary embodiments set forth. Numerous other embodiments may be envisaged without departing from the scope of the invention, which is defined by the appended claims.

What is claimed is:

1. A method of pairing a computer system and an interactive display surface, comprising:
   at each one of a plurality of computer systems:
      generating a code corresponding to a set of positions on an interactive surface, wherein the code generated by each of the plurality of computer systems is different; and
      storing the respective code;
   at one of the plurality of computer systems:
      generating an image for display, the generated image being in dependence on the code associated with said one of the plurality of computer systems;
   at an interactive display surface:
      detecting selection of a set of positions on said surface; and
      transmitting a code, from said interactive surfaces, corresponding to the set of detected positions;
   further at the one of the plurality of computer systems:
      receiving the transmitted code;
      comparing the stored code and the received transmitted code; and
      pairing the one of the plurality of computer systems and the interactive display surface in determination of a match in the comparing step.

2. The method of claim 1 further comprising the steps of: displaying a plurality of points on said interactive display surfaces, wherein the image generated for display comprises the set of positions, the set of positions being displayed at a sequence of positions.

3. The method of claim 2 wherein the set of positions are displayed with a sequence indicator, the step of detecting including detecting the sequence order, and the stored code further corresponding to an order of sequence positions.

4. The method of claim 3, further comprising in dependence on determination of a match, calibrating said interactive display surface and said one of the plurality of computers in dependence on the transmitted code and the stored code.

5. A non-transitory computer-readable medium for storing computer program code which, when executed on a computer system, performs the method of claim 1.

6. A method of pairing a computer system of an interactive display system with an interactive display surface, comprising, at one of a plurality of computer systems:
   generating a code corresponding to a set of positions on an interactive surface, wherein the code generated is different for each of the plurality of computer systems;
   displaying an image in dependence upon the respective code;
   receiving a code representing one or more detected positions selected on an interactive display surface;
   comparing the generated code and the received code; and
   pairing with the interactive display surface in dependence on a match in the comparing step.

7. A non-transitory computer-readable medium storing a program for causing a computer to execute the method of claim 6.

8. The method according to claim 6 wherein the step of generating a code comprises predetermining a plurality of positions, and predetermining a sequence of said plurality of positions, and the step of receiving comprises receiving data identifying a plurality of detected positions, and a sequence of said detected positions, wherein the comparing step further includes comparing said sequences.

9. The method of claim 8 wherein the step of displaying includes displaying the images on the interactive display of said one of the plurality of interactive display systems, wherein responsive to a match the displayed image is calibrated in dependence upon the detected positions.

10. An interactive display system including a computer system and an interactive display, comprising:
    a memory in a computer system of one of a plurality of computer systems for storing a code corresponding to a sequence of positions on an interactive surface, wherein the code is different for each one of the plurality of computer systems;
    a detector at an interactive surface of one of a plurality of interactive surfaces for detecting selection of a sequence of positions on said surface;
    a transmitter, at said one of the plurality of interactive surfaces, for transmitting a code corresponding to the sequence of detected positions;
    a comparator, at said one of the plurality of computer systems, for comparing a stored codes with a code received from the transmitter of said one of the plurality of interactive surfaces; and
    a controller, at said one of the plurality of interactive displays for pairing one of the plurality of interactive surface with said one of the plurality of computers in determination of a match.

11. A computer system of an interactive display system including a plurality of computer systems, comprising:
    a memory for storing a code corresponding to a sequence of positions on an interactive surface, wherein the code is different for each one of the plurality of computer systems;
    a receiver for receiving a code identifying one or more detected positions selected on an interactive display surface; and a comparator for comparing the received and stored codes, wherein in dependence on a match said computer systems is paired with the interactive display surface from which the code was received.

12. The computer system according to claim 11 wherein the stored code corresponds to a sequence of positions and the received code corresponds to a sequence of detected positions, wherein the comparator compare said sequences.

* * * * *